May 6, 1969     G. RAMON     3,442,545

ATTACHMENTS FOR SHOVELS

Filed Aug. 22, 1967

INVENTOR.

GINO RAMON by Gerald P. Welch

ATTORNEY.

United States Patent Office 3,442,545
Patented May 6, 1969

---

3,442,545
ATTACHMENTS FOR SHOVELS
Gino Ramon, 7123 W. Blue Mound Road,
Wauwatosa, Wis. 53213
Filed Aug. 22, 1967, Ser. No. 662,530
Int. Cl. A01b 1/02
U.S. Cl. 294—59                1 Claim

ABSTRACT OF THE DISCLOSURE

An attachment for a shovel for cement or concrete workers comprising a hook or claw integral with a small plate to be attached on the lower surface of a shovel, about two inches from the blade edge, said hook being backwardly directed to enable a worker to pull reinforcement mesh toward him to raise and tighten the same during the operation of shoveling cement or concrete.

---

Figure 1:
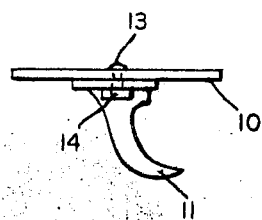
FIG. 1 is a side view in elevation of the plate element 10 with the integral hook or claw 11, and one form of releasable fastening means therefor.
Figure 2:
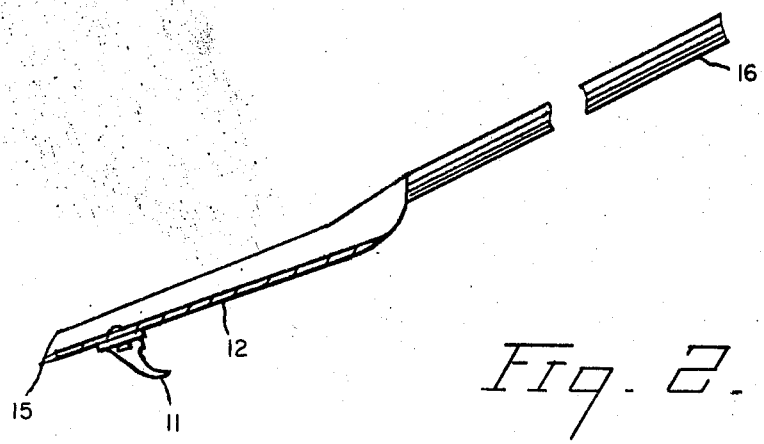
FIG. 2 is a side view in elevation of a shovel 12 provided with a plate and integral hook or claw embodying the invention.
Figure 3:
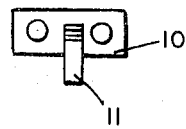
FIG. 3 is an inverted plan view of said plate.

Referring more particularly to the drawing, the numeral 10 refers to a square plate of relatively small area provided with the integral hook or claw 11. Releasable fastening means in the form of bolts 13 and securing nuts 14 are employed to subjoin said plate 10 on the lower surface of shovel 12 approximately two inches from the blade edge 15 of said shovel so disposed that the hook or claw 11 has the point thereof directed backwardly toward the shovel handle 16.

In concrete construction work, the use of metal wire mesh as reinforcement means is common, and the present shovel with its attachment is used for placing and distributing the flowing concrete over the said reinforcing means, and during this operation the hook or claw 11 is employed to lift the mesh and to pull it taut toward the operator as he works. When this particular operation is finished the plate 10 and the integral hook 11 may be quickly and easily removed to enable use of the shovel 12 in the ordinary manner. When equipped with the attachment 10, the shovel 12 saves the use of an extra tool.

It will be understood that the device is capable of many modifications in structure and design, without departing from the spirit of the invention, within the scope of the appended claim.

Having thus described the invention, what is claimed and desired to be secured by Letters Patent of the United States, is:

1. An attachment for shovels employed in concrete placement and distribution comprising a square rectangular flat plate, releasable means for securing the same to the under surface of the shovel adjacent to the frontal blade thereof, and a sharp curved claw or hook integral with and extending downwardly and rearwardly from said plate toward the handle of a shovel to enable the user to pull toward him or raise metal wire reinforcement mesh used in the concrete installation.

References Cited

UNITED STATES PATENTS

| | | | |
|---|---|---|---|
| 747,986 | 12/1903 | Layne | 294—59 |
| 1,055,700 | 3/1913 | Biel | 294—59 |
| 2,371,977 | 3/1945 | Pearce | 294—59 |
| 3,325,835 | 6/1967 | Burns et al. | 294—59 |

ANDRES H. NIELSEN, *Primary Examiner.*